United States Patent
Morley et al.

[11] 3,762,212
[45] Oct. 2, 1973

[54] LEAK TESTING APPARATUS AND METHODS

[75] Inventors: John D. Morley; Paul Forgash, both of Bay City, Mich.

[73] Assignee: Advanced Technologies, Inc., Bay City, Mich.

[22] Filed: July 15, 1971

[21] Appl. No.: 162,854

[52] U.S. Cl. .................................. 73/40.7, 73/49.2
[51] Int. Cl. ............................................ G01m 3/20
[58] Field of Search ..................... 73/37, 49.2, 49.3, 73/40.7

[56] References Cited
UNITED STATES PATENTS

| | | | |
|---|---|---|---|
| 3,186,214 | 6/1965 | Roberts | 73/40.7 |
| 3,520,176 | 7/1970 | Becker | 73/40.7 |
| 3,577,769 | 5/1971 | Roberts | 73/40.7 |
| 3,557,607 | 1/1971 | Riddell et al. | 73/49.2 |
| 3,626,760 | 12/1971 | Briggs et al. | 73/40.7 |

*Primary Examiner*—S. Clement Swisher
*Attorney*—Learman & McCulloch

[57] ABSTRACT

Leak testing a device forming a chamber wherein the device is placed in a test chamber following which a differential pressure is established between the chamber of the device and the test chamber. A tracer gas is introduced to the higher pressure chamber and communication is established between the lower pressure chamber and detecting apparatus such as a mass spectrometer which is sensitive to the tracer medium so as to detect any leakage of the tracer medium from the higher pressure chamber to the lower pressure chamber. At the inlet to the detecting apparatus is established a pressure chamber as to provide laminar flow from the lower pressure chamber to the inlet to the detecting apparatus.

7 Claims, 1 Drawing Figure

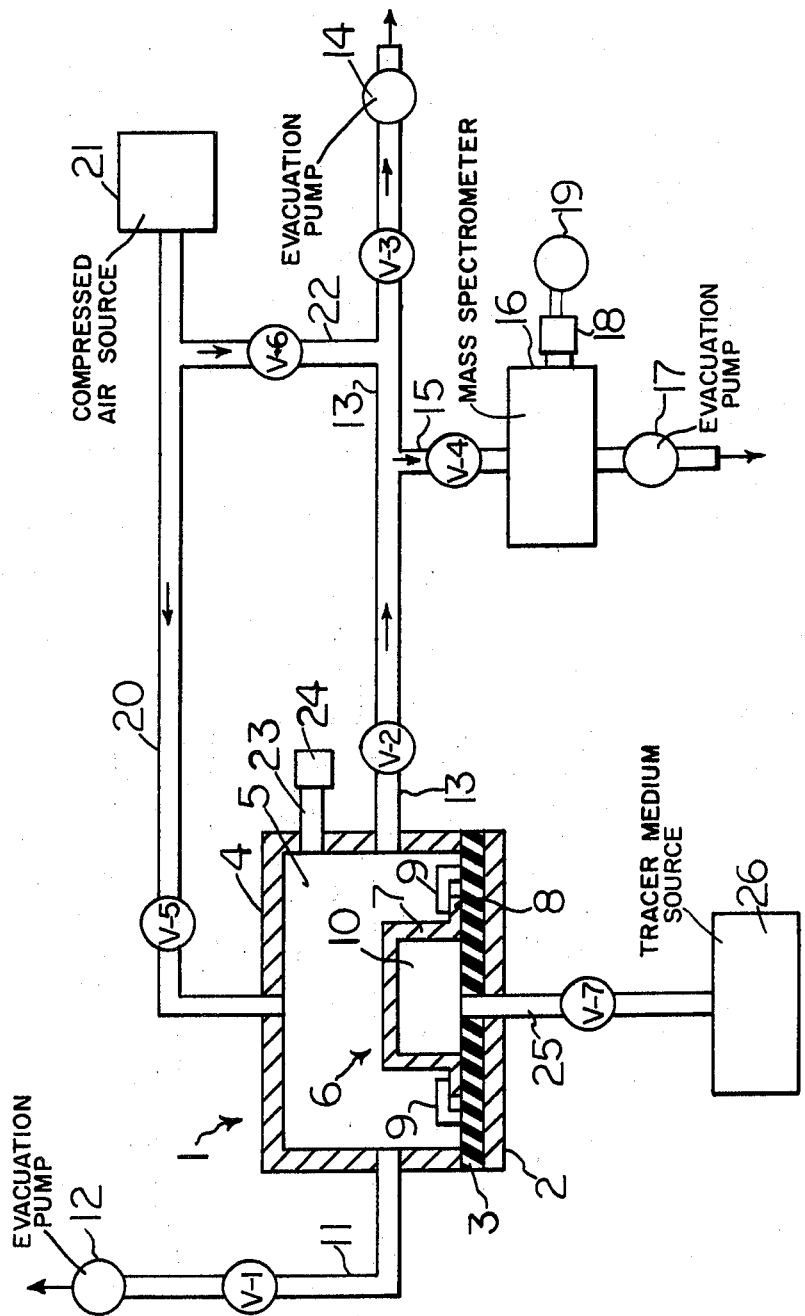

LEAK TESTING APPARATUS AND METHODS

Mass spectroscopy and mass spectrometer testing methods and apparatus now are well known and provide reliable means and methods for testing the integrity of production parts. Conventional mass spectrometer apparatus and methods, however, require the expenditure of substantial time from one cycle to the next because of the reliance upon molecular flow of the leak-indicating or tracer medium between the test chamber and the mass spectrometer. A considerable part of this time is consumed in evacuating either the part to be tested or the test chamber itself to a pressure sufficiently low to assure molecular flow of the tracer medium. Molecular flow of the tracer medium heretofore has been necessary in order to assure the introduction of a sufficiently small quantity of tracer medium to the mass spectrometer as to prevent flooding of the latter while still assuring proper operation thereof. Not only does the evacuation of a part to be tested or the test chamber itself to a sufficiently low pressure as to provide for molecular flow of the tracer medium require an undue length of time, but the extremely low pressure necessary for such molecular flow creates moisture problems, excessive pumping problems, and sealing problems for the test chamber and the part to be tested.

An object of this invention is to provide spectrometer leak testing apparatus and methods which overcome the disadvantages of previously known methods and apparatus for similar purposes.

Another object of this invention is to provide mass spectrometer leak testing apparatus and methods which permit laminar flow of the tracer medium, thereby minimizing greatly the time and related difficulties encountered in evacuating a part or test chamber.

A further object of the invention is to provide apparatus and methods of the character referred to which minimize considerably the amount of time required between test cycles.

Other objects and advantages of the invention will be pointed out specifically or will become apparent from the following description when it is considered in conjunction with the appended claims and the accompanying drawing, wherein the single FIGURE is a schematic diagram of apparatus constructed in accordance with the invention.

The leak testing apparatus comprises a test chamber 1 having a fixed base 2 on which is mounted a sealing member 3 for the removable reception of a hollow cover member 4 which, when fitted onto the seal 3, forms a chamber 5. Adapted for removable accommodation in the chamber 5 is a part 6 to be tested for leakage. The part to be tested can be any one of a large number of different devices, but as shown the part comprises a hollow vessel 7 provided with a peripheral flange 8 which may be supported on the seal 3 and clamped thereagainst by clamps 9 so that the vessel and seal form an airtight chamber 10.

In communication with the chamber 5 is a conduit 11 which also communicates with a suction or vacuum pump 12 via a normally open valve V-1 which is operable to enable or disable the flow of fluid through the line 11 in the direction of the arrow. Also in communication with the chamber 5 is a conduit 13 which communicates with a second vacuum pump 14 via normally closed valves V-2 and V-3 which are operable to enable and disable the flow of fluid from the chamber 5 in the direction of the arrows. The conduit 11 and the pump 12 have considerably greater capacities than those of the line 13 and pump 14.

In communication with the conduit 13 at a point between the valves V-2 and V-3 is a tube 15 which provides an inlet to a mass spectrometer 16 of known construction. A normally closed valve V-4 is mounted in the inlet 15 and is operable to enable and disable the flow of fluid in the direction of the arrow into the mass spectrometer. As is conventional, the mass spectrometer includes a vacuum pump shown at 17 which establishes a low pressure within the mass spectrometer. The mass spectrometer also includes a conventional electrical switch shown at 18 which normally is open, but which closes in response to the presence of a selected fluid in the mass spectrometer. The switch 18 may be connected in the electrical circuit of an alarm signal 19 or other device or devices in the part handling system of a machine.

If desired, a conduit 20 may establish communication between a source 21 of compressed air and the test chamber 5 via a normally closed valve V-5 which selectively enables and disables the flow of air from the source 21 in the direction of the arrow to the chamber 5. A tube 22 establishes communication between the source 21 and the conduit 13 between the mass spectrometer and the valve V-3. A normally closed valve V-6 selectively permits and prevents the flow of fluid from the source 21 in the direction of the arrow to the conduit 13.

All of the valves V-1 – V-6 are two-way solenoid actuated valves of conventional construction. For example, the valves may be those manufactured by Automatic Switch Co., of Florham Park, N.J., and described in the manufacturer's bulletin No. 8261–63.

In communication with the chamber 5 is a tube 23 to which is connected a vacuum sensitive thermocouple gauge and point-set meter of known construction. The meter has a first manually settable pointer which may be adjusted to a desired position and a second pointer which is movable toward and away from the first pointer in accordance with changes in vacuum within the chamber 5. The arrangement is such that, when the two pointers reach the same position, an electrical circuit is completed to selected ones of the valves V-1 - V-6 as will be explained more fully hereinafter.

Extending into the test chamber is one end of a conduit 25 and which is so located in the disclosed embodiment as to communicate with the chamber 10 of the vessel 6. The other end of the conduit 25 communicates with a pressurized source 26 of a tracer medium which is compatible with the mass spectrometer 16 and which may be admitted to the chamber 10 under the control of a valve V-7. The tracer medium preferably is helium because of its ready availability, small atom size, non-toxicity, fast diffusion, and rapid dissipation, but other gases compatible with the mass spectrometer may be used if desired. To reduce the cost, the tracer medium may be a mixture of air and helium or other gas, rather than pure gas.

To condition the apparatus for operation, the cover member 4 is removed from the base 2 and the vessel 6 is clamped in place thereon so that the flange 8 is in sealing relation with the seal 3. The member 4 then may be placed over the vessel 6 and clamped or otherwise secured in sealing relation with the seal 3. The valve V-7 then may be opened momentarily so as to permit a small quantity of the tracer medium to enter the chamber 10 from the source 26. The valve V-1 then may be opened, permitting the pump 12 to begin evacuation of the chamber 5 so as to reduce the pressure therein to sub-atmospheric and establish a pressure differential between the chambers 5 and 10.

The manually adjustable pointer of the point-set meter 24 may be adjusted to a position corresponding to a pressure of 0.01 to 10 torr (100–10,000 microns of mercury), or more. As the chamber 5 is evacuated, the movable pointer of the point-set meter will move toward the manually settable pointer. When the chamber has been evacuated to an extent such that the movable pointer reaches the same position as that occupied by the manually settable pointer, an electrical circuit will be completed to the valve V-3 so as to open it and permit the pump 14 to evacuate the line 13, following which a circuit is completed to the valves V-2 and V-4 so as to open them and permit fluid from the chamber 5 to flow through the line 13.

The pressure at the inlet 15 to the mass spectrometer 16 should be lower than that of the chamber 5 so as to assure laminar flow of fluid from the chamber 5 into the inlet 15. The pressure at the inlet 15 preferably is maintained between about 10 and about 50 microns of mercury which is sufficiently lower than the pressure in the chamber 5 to assure laminar flow from the chamber 5 to the inlet 15. The vacuum pump 17 forming part of the mass spectrometer reduces the pressure within the latter to one sufficiently lower than the pressure at the inlet 15 to assure movement of gas from the inlet 15 to the mass spectrometer. Since the gas introduced to the mass spectrometer can come only from the chamber 5, any leakage from the chamber 10 into the chamber 5 will result in the tracer medium being present in the gas delivered to the mass spectrometer. If the quantity of tracer medium in the gas is sufficient to activate the switch 18 of the mass spectrometer, the signal device 19 forming part of the mass spectrometer will be energized so as to indicate that the part under test has an objectionable leak.

Following the end of a test cycle, the valves V-3 and V-4 may be closed and the valves V-5 and V-6 opened so that air from the source 21 may be delivered to the conduit 13 and the chamber 5 to purge them of any tracer medium. Thereafter, the cover member 4 may be lifted and the vessel 6 removed, whereupon the apparatus is in condition for testing another part.

The pressure at the mass spectrometer inlet 15 is dependent primarily upon four factors: first, the capacity of the pump 14; second, the cross-sectional area or inside diameter of the conduit 13; third, the length of the conduit 13 from the inlet 15 to the intake of the pump 14; and fourth, the vacuum level in the chamber 5 at the time of the test.

It will be understood that the capacity of the pump 14, the diameter of the conduit 13, and the distance between the inlet 15 and the pump 14 may vary considerably from one installation to another. In one installation, the capacity of the pump 14 was 2 cubic feet per minute, the inside diameter of the conduit 13 was one-fourth inch and the distance between the inlet of the pump 14 and the inlet of the mass spectrometer was 30 inches. The volume of the test chamber 5 was 5 cubic inches, the diameter of the line 11 was 1½ inches, and the capacity of the pump 12 was 17 cubic feet per minute. In this installation a vacuum of 25 microns and mercury was established at the inlet 15 when the vacuum within the chamber 5 was maintained at 1 torr and the pressure within the mass spectrometer was maintained at about $10^{-5}$ torr.

The principal advantage of the apparatus and methods herein disclosed is that a great amount of time between test cycles is saved as compared with the time between test cycles of conventional methods and apparatus. The reduction in time between cycles when using the disclosed apparatus is due primarily to the fact that the pressure of those parts of the system between the test chamber and the mass spectrometer inlet need not be lowered to the extent necessary to produce molecular flow of the tracer medium. Another advantage is that the mass spectrometer instrument can be located more conveniently with respect to the test chamber, even up to ten feet distant.

Although the apparatus illustrated in the drawing relies upon the establishment of a greater vacuum in the chamber 5 than is established in the chamber 10, it should be understood that it is possible to reverse the procedure simply by rearrangement of the parts 11, 13, and 25 so as to evacuate the chamber 10 and introduce the tracer medium to the chamber 5.

The disclosed methods and apparatus are representative of presently preferred forms of the embodiments of the invention, but this disclosure is intended to be illustrative rather than definitive of the invention. The invention is defined in the claims.

We claim:

1. Apparatus for testing for leakage a part forming a chamber, said apparatus comprising means forming a test chamber for the accommodation of said part; said first evacuation pump for establishing a predetermined sub-atmospheric pressure in one of said chambers and a pressure differential between said chambers; means for introducing a fluid tracer medium to the other of said chambers; a device for detecting said tracer medium and having an inlet; means for establishing communication between said one of said chambers and said inlet following the establishment of said predetermined pressure in said one of said chambers; a second evacuation pump; and conduit means extending between said second pump and said inlet, said second pump beinoperable to establish at said inlet a pressure sufficiently lower than the pressure in said one of said chambers to produce laminar flow from said one of said chambers to said inlet.

2. The apparatus set forth in claim 1 wherein the pressure maintained within said one chamber is between about 100 and about 10,000 microns or mercury.

3. The apparatus set forth in claim 1 wherein the pressure maintained at said inlet is between about 10 and about 50 microns of mercury.

4. The apparatus set forth in claim 1 wherein the pressure maintained in said one chamber is between about 100 and about 10,000 microns of mercury and the pressure maintained at said inlet is between about 10 and about 50 microns of mercury.

5. The apparatus set forth in claim 1 wherein said first pump has a greater capacity than said second pump.

6. The apparatus set forth in claim 1 wherein said second evacuation pump is located downstream from said inlet a distance so selected with reference to the capacity of said second pump and the length and cross-sectional area of said conduit means that the pressure at said inlet is maintained between about 10 and about 50 microns of mercury.

7. The apparatus as set forth in claim 1 wherein the means for establishing communication between said one of said chambers and said inlet includes normally closed valves means and means operable in response to the establishment of said predetermined pressure in said one of said chambers to open said valve means.

* * * * *